United States Patent
Savoor et al.

(10) Patent No.: US 8,064,413 B2
(45) Date of Patent: Nov. 22, 2011

(54) ADAPTIVE RATE AND REACH OPTIMIZATION FOR WIRELESS ACCESS NETWORKS

(75) Inventors: Raj Savoor, Walnut Creek, CA (US); Canhui Ou, Danville, CA (US); Jin Wang, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 569 days.

(21) Appl. No.: 11/432,490

(22) Filed: May 12, 2006

(65) Prior Publication Data

US 2007/0263587 A1    Nov. 15, 2007

(51) Int. Cl.
H04W 4/00 (2009.01)
H04W 72/00 (2009.01)

(52) U.S. Cl. ...... 370/338; 455/450; 455/453; 455/452.1

(58) Field of Classification Search .......... 455/450–454, 455/127.1, 127.2; 370/338
See application file for complete search history.

(56) References Cited

U.S. PATENT DOCUMENTS

| | | | | |
|---|---|---|---|---|
| 4,571,678 A * | 2/1986 | Chaitin | ................. | 717/156 |
| 4,736,453 A * | 4/1988 | Schloemer | ................. | 455/450 |
| 5,561,841 A * | 10/1996 | Markus | ................. | 455/446 |
| 6,023,459 A * | 2/2000 | Clark et al. | ................. | 370/329 |
| 6,311,067 B1 * | 10/2001 | Sammour et al. | ................. | 455/446 |
| 6,314,294 B1 * | 11/2001 | Benveniste | ................. | 455/452.2 |
| 6,496,490 B1 * | 12/2002 | Andrews et al. | ................. | 370/329 |
| 6,892,073 B2 * | 5/2005 | Fattouch | ................. | 455/446 |
| 7,190,743 B2 * | 3/2007 | Learned | ................. | 375/340 |
| 7,327,697 B1 * | 2/2008 | Friday et al. | ................. | 370/278 |
| 7,366,504 B2 * | 4/2008 | Backes | ................. | 455/418 |
| 7,477,914 B2 * | 1/2009 | Jalil et al. | ................. | 455/524 |
| 2003/0171122 A1 * | 9/2003 | Kim et al. | ................. | 455/452 |
| 2003/0198200 A1 * | 10/2003 | Diener et al. | ................. | 370/329 |
| 2004/0072566 A1 * | 4/2004 | Kuwahara et al. | ................. | 455/440 |
| 2004/0078598 A1 * | 4/2004 | Barber et al. | ................. | 713/201 |
| 2004/0162082 A1 * | 8/2004 | Bacceli et al. | ................. | 455/453 |
| 2004/0248580 A1 * | 12/2004 | Backes et al. | ................. | 455/450 |
| 2005/0058151 A1 * | 3/2005 | Yeh | ................. | 370/445 |
| 2005/0085190 A1 * | 4/2005 | Nishikawa | ................. | 455/63.1 |
| 2005/0122231 A1 * | 6/2005 | Varaiya et al. | ................. | 340/870.01 |
| 2005/0210157 A1 * | 9/2005 | Sakoda | ................. | 709/251 |
| 2005/0288031 A1 * | 12/2005 | Davis et al. | ................. | 455/452.1 |
| 2006/0172781 A1 * | 8/2006 | Mohebbi | ................. | 455/571 |
| 2006/0227751 A1 * | 10/2006 | Theobold et al. | ................. | 370/338 |

OTHER PUBLICATIONS

Canadian Office Action from Canadian Intellectual Property Office, mailed May 10, 2011.

* cited by examiner

*Primary Examiner* — Rafael Pérez-Gutiérrez
*Assistant Examiner* — Allahyar Kasraian
(74) *Attorney, Agent, or Firm* — Greenblum & Bernstein, P.L.C.

(57) ABSTRACT

A wireless local area network (WLAN) control system includes network elements (such as access points and clients) and a centralized dynamic performance management system. The network elements measure signal attenuation in communications with other WLAN network elements. The dynamic performance management system receives signal attenuation data from the network elements, and determines a frequency and/or transmission power level for each of the network elements to reduce interference with the other WLAN network elements. The dynamic performance management system also transmits instructions to each network element to control the frequency and/or transmission power level of the network elements.

15 Claims, 5 Drawing Sheets

FIGURE 3

|  | Access Point 10 | Access Point 20 | Access Point 30 | Client 14 | Client 24 | Client 34 |
|---|---|---|---|---|---|---|
| Access Point 10 |  | 30 dB | 0 dB | 10 dB | 40 dB | 50 dB |
| Access Point 20 |  |  | 52 dB | 47 dB | 8 dB | 70 dB |
| Access Point 30 |  |  |  | 50 dB | 60 dB | 12 dB |
| Client 14 |  |  |  |  | 54 dB | 49 dB |
| Client 24 |  |  |  |  |  | 40 dB |
| Client 34 |  |  |  |  |  |  |

FIGURE 4

|  | Access Point 10 | Access Point 20 | Access Point 30 |
|---|---|---|---|
| Access Point 10 |  | x |  |
| Access Point 20 | x |  | x |
| Access Point 30 |  | x |  |

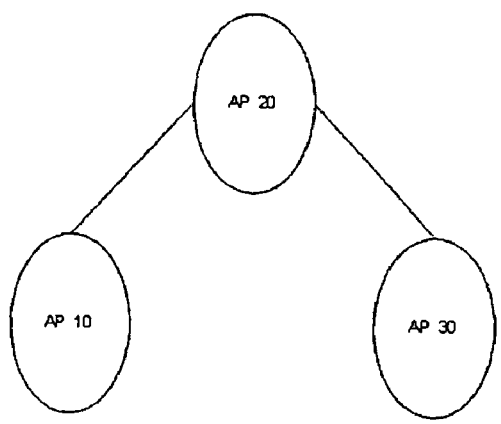
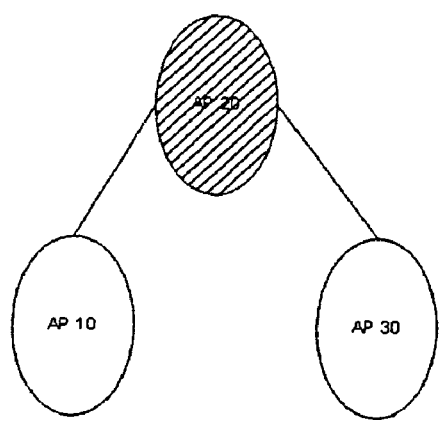
FIGURE 5                    FIGURE 6

ADAPTIVE RATE AND REACH OPTIMIZATION FOR WIRELESS ACCESS NETWORKS

BACKGROUND

1. Field of the Disclosure

The present disclosure relates to wireless communications. More particularly, the present disclosure relates to controlling wireless local area networks (WLANs).

2. Background Information

Over the past several years, computer networks have become increasingly mobile. One wireless local area networking (WLAN) technology is WiFi, i.e., 802.11. WiFi is a member of the IEEE 802 family, which is a series of specifications for local area network (LAN) technologies. In this family, there are other well-known specifications such as 802.3, i.e., Ethernet. Another WLAN technology is WiMax defined by the IEEE 802.16 standard.

WLANs complement existing fixed networks by providing mobility to users, just as mobile telephones complement fixed wireline telephony. The advantage of mobility is gained by employing a much more open network medium: free space. However, as free space lacks a physical boundary, signals can be sent or received by any device complying with the WLAN standard and therefore different WLANs in a geographical region may interfere with each other. Wireless users in a home WiFi network often observe the presence of several WiFi LANs in their neighborhood. Some even detect that the signal of a neighbor's wireless router is much stronger than their own. When WLANs interfere with each other, connection speed in each LAN is adversely impacted and the aggregate throughput of the WLANs (consisting of all WLANs in one geographical area) is reduced.

Currently, there exist simple methods to reduce the interference between WLANs. Individual WiFi Access Points (AP) or WiFi routers may implement Transmit Power Control (TPC) and Dynamic Frequency Selection (DFS) services specified in the 802.11x standard. However, TPC and DFS do not aim at global optimization because they are independently and optionally implemented by individual WiFi LANs.

Without a central capacity and performance management system, it is unlikely for WLANs to coordinate with each other and to achieve overall maximum capacity. With WLANs becoming more and more popular and the interference between WLANs occurring more often, the lack of central capacity and performance management is severely degrading the performance of WLANs by reducing the connection speed of individual links and the aggregate throughput of the whole network.

There is a need for addressing the issues identified above.

BRIEF DESCRIPTION OF THE DRAWINGS

FIG. 3 shows an exemplary interference matrix, according to an aspect of the present invention;

FIG. 4 shows an exemplary adjacency matrix, according to an aspect of the present invention;

FIG. 5 shows an exemplary graph corresponding to the adjacency matrix of FIG. 4, according to an aspect of the present invention; and FIG. 6 shows an exemplary colored graph, according to an aspect of the present invention.

DETAILED DESCRIPTION

Figure 1:
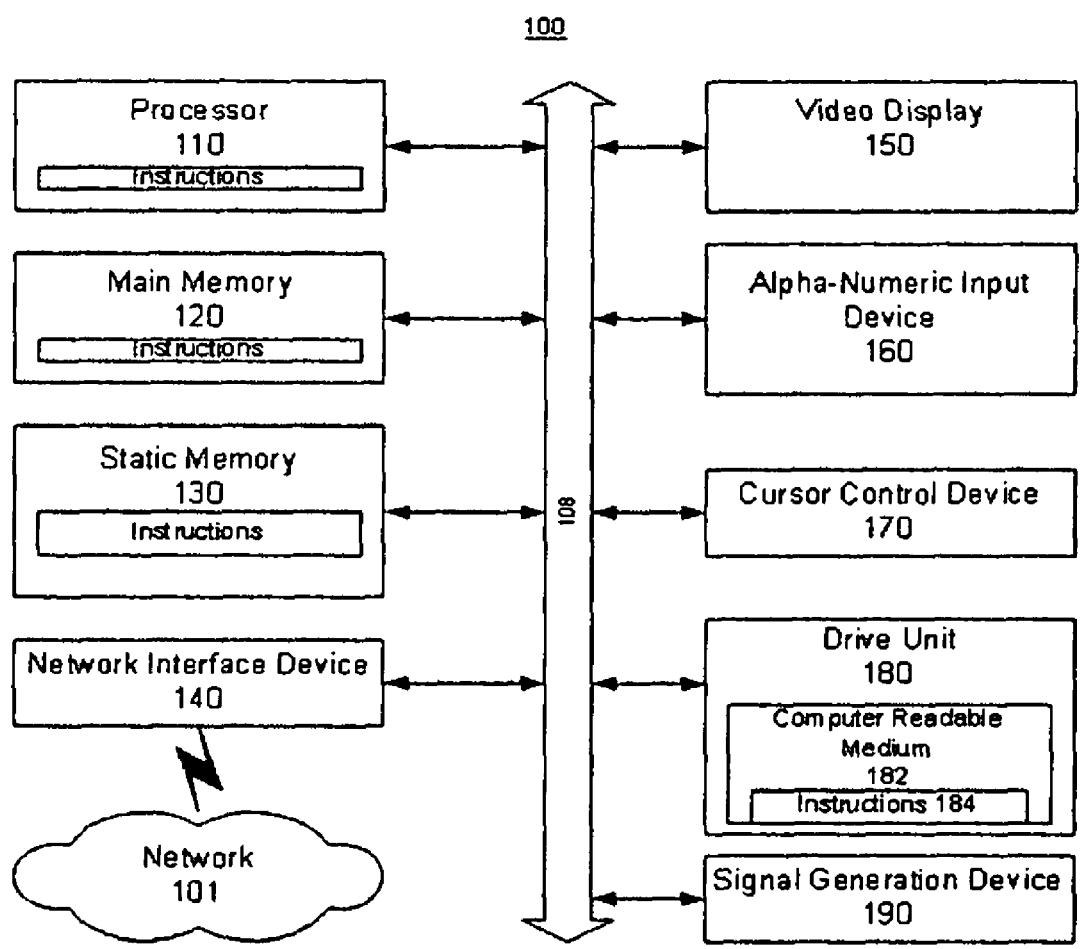
FIG. 1 shows an exemplary general computer system that can operate within the WLAN system.

In view of the foregoing, the present disclosure, through one or more of its various aspects, embodiments and/or specific features or sub-components, is thus intended to bring out one or more of the advantages as specifically noted below.

The present disclosure pertains to a centralized dynamic performance management (DPM) system for wireless networks consisting of independent wireless LANs, such as WiFi LANs and WiMax networks. The dynamic performance management system can coordinate the operation of independent WLANs and improve aggregate WLAN throughput.

In one aspect of the present invention, a computer readable medium stores a program for controlling network elements of wireless local area networks (WLANs). The program includes a WLAN network element polling code segment that receives interference data from the WLAN network elements, the interference data indicating network elements that interfere with the WLAN network elements. The program has a frequency/power determination code segment that determines a frequency and/or transmission power level for each WLAN network element to reduce interference with the interfering network elements. The program also has a transmitting code segment that transmits instructions to each WLAN network element to control the frequency and/or transmission power level of the WLAN network elements.

The WLANs can be 802.11 networks and/or 802.16 networks. In one embodiment, the instructions are a dynamic frequency selection (DFS) instruction and/or a transmit power control (TPC) instruction.

The frequency/power determination code segment can determine that the power level should be an increased power level when a signal attenuation value between an access point and a client is above a threshold value.

The frequency/power determination code segment can determine the frequency and/or the transmission power level by generating an adjacency matrix based upon the received interference data. The frequency and/or the transmission power level can be determined by graph coloring based upon the generated adjacency matrix. The graph coloring can include a number of colors that is equal to a number of channels available in the WLANs. The transmission power level can be a reduced power level for at least one of the WLAN network elements when the graph coloring requires more than the number of colors in order to reduce interference.

In another aspect, a dynamic performance management system controls wireless networks. The system includes a receiver that receives interference data from WLAN network elements, the interference data indicating network elements that interfere with the WLAN network elements. The system also includes a frequency/power determination system that determines a frequency and/or transmission power level for each WLAN network element to reduce interference with the interfering network elements. The system also has a transmitter that transmits instructions to each WLAN network element to control the frequency and/or transmission power level of the WLAN network elements.

In still another aspect, a wireless local area network (WLAN) control system includes access points that measure signal attenuation in communications with other WLAN network elements. The system also has a dynamic performance management system that receives signal attenuation data from the access points, determines a frequency and/or transmission power level for each of the access points to reduce interference with the other WLAN network elements, and transmits instructions to each access point to control the frequency and/or transmission power level of the access points.

In yet another aspect, a method for controlling network elements of wireless local area networks (WLANs) includes receiving interference data from the WLAN network elements, the interference data indicating network elements that interfere with the WLAN network elements. The method also includes determining a frequency and/or transmission power level for each WLAN network element to reduce interference with the interfering network elements. The method further includes transmitting instructions to each WLAN network element to control the frequency and/or transmission power level of the WLAN network elements.

According to an aspect of the disclosure, the aggregate throughput and reach of a wireless access networks, such as a WiFi or WiMax network, is improved through a dynamic performance management (DPM) system. The dynamic performance management system collects performance data from multiple devices and adaptively improves the rate and reach using adaptive and self learning controls, such as Transmit Power Control (TPC) and Dynamic Frequency Selection (DFS). Although the following description primarily refers to WiFi networks, the present invention contemplates alternative WLANs, such as WiMax networks.

Figure 2:
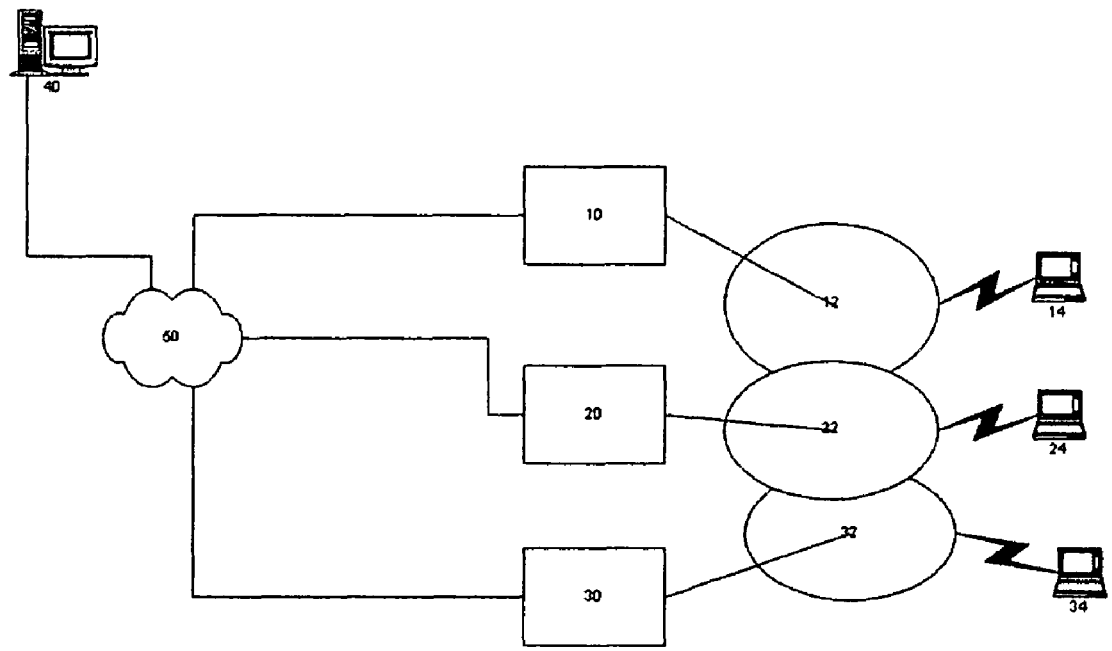
FIG. 2 shows an exemplary WLAN system including a dynamic performance management system, according to an aspect of the present invention.

FIG. 2 shows representative WiFis network with a centralized dynamic performance management (DPM) system 40. In FIG. 2, three access points (AP) 10, 20, 30 each have a corresponding coverage area 12, 22, 32. A WiFi client 14, 24, 34 is located in each coverage area 12, 22, 32 to enable communications with the corresponding access point 10, 20, 30. In this description, it is assumed that each access point only serves a single client for the sake of simplicity. Of course multiple clients can be served by an access point and more than three access points could be provided. The dynamic performance management system 40 connects to each access point 10, 20, 30 via a network 50, such as the Internet.

Each access point 10, 20, 30 may be connected to a distribution system such as a wired Ethernet (not shown), or they can lie in independent WiFi LANs with no direct connection between each other. The latter case is representative of a residential WiFi network, where each premise has an independent wireless LAN which connects to the Internet through, for example, DSL, cable or fiber. These wireless LANs do not communicate with each other.

During the network initiation phase, the dynamic performance management system 40 coordinates all access points 10, 20, 30 and clients 14, 24, 34 to conduct a medium characterization so as to obtain performance data, e.g., the signal attenuation, between any two WiFi devices (AP or client). Although signal attenuation is discussed, alternative interference measurements could be substituted, such as signal to noise ratio. Moreover, interference with outside sources, such as RADAR could be detected.

In an embodiment, interference is measured by a radio link measurement. For example, access point 10 sends a beacon to access point 20 with a fixed signal strength, such as 0 dBm. If access point 20 receives the signal and the power is −10 dBm, then the attenuation is determined to be 10 dB. Each network element attempts to communicate with each other network element in this manner to obtain a complete picture of network interference.

At the end of characterization, the dynamic performance management system 40 populates an interference matrix. FIG. 3 shows an exemplary populated interference matrix. In FIG. 3, the value of a cell specifies the signal attenuation from the row WiFi device to the column WiFi device. For example, access point 10 has a 30 dB signal attenuation with respect to access point 20.

Based upon the interference matrix, an adjacency matrix can be generated. FIG. 4 shows a simplified adjacency matrix based upon the interference matrix of FIG. 3. The adjacency matrix is simplified in that it only show access points 10, 20, 30, and not clients 14, 24, 34. However, the concept equally applies to clients as well as access points and any other network elements. In FIG. 4, an "x" in a cell indicates that the row WiFi device has an unacceptable level of interference with the column WiFi device. For example, FIG. 4 indicates that access point 10 has an unacceptable level of interference with access point 20, and also that access point 20 has an unacceptable level of interference with access point 30. Acceptable attenuation values are well known, and the measured values are compared with the acceptable values to determine whether unacceptable interference exists.

The connection speed between each access point/client pair, and hence the aggregate WiFi throughput, depends on the channel frequency allocation and the interference matrix of FIG. 3. As this dependency usually can be expressed analytically or numerically, the dynamic performance management system 40 will be able to improve (or possibly maximize) the overall WiFi throughput by optimizing the channel frequency allocation and transmit power for each access point/client pair. Under the control of the dynamic performance management system 40, some access point/client pairs may have to reduce transmit power if they are interfering severely with other access point/client pairs. On the contrary, some access point/client pairs may be able to use higher power than that specified by TPC service when the pair is far away from other access point/client pairs and therefore unlikely to impact them. For example, if the signal attenuation between an access point and its associated client is high, it is known that more power is needed. The converse can also be true, which could reduce interference with other access points and clients.

An adjacency matrix for different networks can be generated based on the interference matrix and the known acceptable levels of interference. Based upon the adjacency matrix, the dynamic performance management system 40 can then optimally allocate appropriate channels for each network so that the interference is reduced (e.g., minimized). In one embodiment, the technique employed is called "graph coloring."

The adjacency matrix (e.g., as shown in FIG. 4) can be modeled as a graph by creating a vertex for each network element. An edge exists between two vertices A and B if there is an "x" marked at both cell (A:B) and cell (B:A). For example, the cell corresponding to access point 10 and access point 20, as well as the cell corresponding to access point 20 and access point 10 both contain an "x." Thus, an edge exists between access point 10 and access point 20, as shown in FIG. 5. Similarly, the cell corresponding to access point 20 and access point 30, as well as the cell corresponding to access point 30 and access point 20 both contain an "x." Thus, an edge exists between access point 20 and access point 30, as also shown in FIG. 5.

The vertices of the graph can then be colored in a way such that no adjacent vertices have the same color, or in other words, no interfering networks are assigned the same channel. When two interfering networks are assigned different channels, or frequencies, the interference between these two networks is significantly reduced. As a result, the channel assignment problem for wireless access networks to reduce interference can be equated to coloring the corresponding graph so that adjacent vertices have different colors.

FIG. 6 shows the coloring results of the graph of FIG. 5. In FIG. 6, it can be seen that access point 20 is a different "color" than access point 10 and access point 30. That is, the shaded representation of access point 20 is different from the non-shaded representation of access points 10 and 30. Of course, in a color drawing, colors would be used instead of dotted and solid lines.

WiFi networks typically have 14 different channels (or 12 in some countries). Consequently, the dynamic performance management system 40 colors the corresponding graph with a maximum of 14 (or 12) colors. As the size of a WiFi network grows, it may become impossible to color the WiFi network with only 14 colors. In that case, the dynamic performance management system 40 can prune the number of edges in the corresponding graph so that 14 colors (or 12 colors) are enough. In other words, some vertices will have their power reduced (e.g., in an ad hoc manner) so that a smaller graph results from the interference analysis. In one embodiment, newly added nodes will have their power adjusted first.

Both access point and client may be mobile, implying the channel attenuation between them may vary frequently. Even when access point and client are fixed, the channel attenuation can still vary due to the temporal change of the wireless medium. In one embodiment, the above-described analysis is repeated every two weeks to compensate for the dynamic nature of the attenuation. In addition, a new access point or client may join in the WiFi network. When a new network element joins the WLAN, the interference matrix also needs to be dynamically changed. Whenever the channel attenuation matrix is updated, the dynamic performance management system 40 should decide if the allocation of channel frequency and transmit power for each access point/client pair should change in order to improve the aggregate WiFi throughput. Therefore, the dynamic performance management system 40 and the mechanism to improve aggregate WiFi throughput are both adaptive.

In summary, the dynamic performance management system architecture includes an adaptive data collection and monitoring centralized system; a dynamic and self learning performance control and provisioning system; and a reporting subsystem and network management console.

Referring to FIG. 1, a description is now provided of an illustrative embodiment of a general computer system 100, on which the centralized WLAN control functionality can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A tangible computer readable medium storing a program for controlling a plurality of wireless local area network elements of a plurality of wireless local area networks, comprising:
    a defining segment that defines the plurality of wireless local area network elements and the plurality of wireless local area networks;
    a network initiation segment that instructs each wireless local network element to attempt to communicate with each other wireless local network element in each of the plurality of wireless local area networks to generate interference data;
    a wireless local area network element polling code segment that receives the interference data from the plurality of wireless local area network elements, the interference data indicating network elements that interfere with the other wireless local area network elements;
    an interference matrix segment that, based upon the interference data, generates an interference matrix that corresponds to a representation of network interference, and includes determined interference data for each set of wireless local area networks;
    a frequency/power determination code segment that determines a frequency and/or transmission power level for each wireless local area network element to reduce interference with the interfering network elements, the frequency/power determination code segment determining the power level to be an increased power level when a signal attenuation value between an access point and a client is above a threshold value; and
    a transmitting code segment that transmits instructions to each wireless local area network element to control the frequency and/or transmission power level of the wireless local area network elements,
    wherein the frequency/power determination code segment determines the frequency and/or the transmission power level by generating an adjacency matrix, showing the acceptable and unacceptable levels of interference between each set of two wireless local network elements, based upon the interference matrix, and by coloring a graph, using a predetermined maximum number of colors, based upon the generated adjacency matrix, wherein the frequency/power determination code segment prunes most recently added nodes from the graph in a sequential order starting with a newest added node, when the predetermined maximum number of colors are insufficient to color the graph, and continues pruning until the predetermined maximum number of colors are sufficient to color the graph, and wherein the interference data includes determined interference data between every possible combination of two wireless local area network elements that are included in the plurality of wireless local area networks, and wherein each combination of two wireless local area network elements is designated as a set of wireless local area networks.

2. The medium of claim 1, in which each of the wireless local area networks comprises an 802.11 network.

3. The medium of claim 2, in which the instructions comprise a dynamic frequency selection instruction.

4. The medium of claim 2, in which the instructions comprise a transmit power control instruction.

5. The medium of claim 1, in which each of the wireless local area networks comprises an 802.16 network.

6. The medium of claim 1, in which the predetermined maximum number of colors is 14, which is equal to a number of channels available in the wireless local area networks.

7. The medium of claim 1, in which the transmission power level is a reduced power level for at least one of the plurality of wireless local area network elements when the graph coloring requires more than the predetermined maximum number of colors, which is equal to the number of channels available in the wireless local area networks, in order to reduce interference.

8. A dynamic performance management system for controlling wireless networks, comprising:

a plurality of defined wireless local area network elements that attempt to communicate with each other wireless local area network elements during an initiation phase to generate interference data, wherein each wireless local area network element is included in at least one of a plurality of wireless local area networks;

a receiver that receives the interference data from the plurality of wireless local area network elements, the interference data indicating network elements that interfere with the other wireless local area network elements;

an interference matrix system that generates an interference matrix based upon the interference data that corresponds to a representation of network interference, and includes determined interference data for each set of wireless local area networks;

a frequency/power determination system that determines a frequency and/or transmission power level for each wireless local area network element to reduce interference with the interfering network elements, the frequency/power determination system determining the power level to be an increased power level when a signal attenuation value between an access point and a client is above a threshold value; and a transmitter that transmits instructions to each wireless local area network element to control the frequency and/or transmission power level of the wireless local area network elements, wherein the frequency/power determination system determines the frequency and/or the transmission power level by generating an adjacency matrix, showing the acceptable and unacceptable levels of interference between each set of two wireless local network elements, based upon the interference matrix, and by coloring a graph, using a predetermined maximum number of colors, based upon the generated adjacency matrix, wherein the frequency/power determination system prunes most recently added nodes from the graph in a sequential order starting with a newest added node, when the predetermined maximum number of colors are insufficient to color the graph, and continues pruning until the predetermined maximum number of colors are sufficient to color the graph, and wherein the interference data includes determined interference data between every possible combination of two wireless local area network elements that are included in the plurality of wireless local area networks, and wherein each combination of two wireless local area network elements is designated as a set of wireless local area networks.

9. The system of claim 8, in which at least one of the wireless local area network elements comprises an access point.

10. The system of claim 9, in which each of the wireless local area networks comprises an 802.11 network.

11. The system of claim 10, in which the instructions comprise a dynamic frequency selection instruction.

12. The system of claim 10, in which the instructions comprise a transmit power control instruction.

13. The system of claim 9, in which each of the wireless local area networks comprises an 802.16 network.

14. A wireless local area network control system comprising: a plurality of defined access points that measure signal attenuation in communications with a plurality of defined other wireless local area network elements, wherein the plurality of access points and the plurality of other wireless local area network elements attempt to communicate with each other to generate signal attenuation data, wherein the signal attenuation data includes determined interference data between every possible combination of two access points, two wireless local area network elements, and one access point and one wireless local area network element, and wherein each combination is designated as an attenuation data set;

a dynamic performance management system that receives the signal attenuation data from the plurality of access points, generates an interference matrix based upon the signal attenuation data that corresponds to a representation of network interference and that includes information representing each attenuation data set, determines a frequency and/or transmission power level for each of the plurality of access points to reduce interference with the other wireless local area network elements, and transmits instructions to each access point to control the frequency and/or transmission power level of the access points, wherein the dynamic performance management system determines the power level to be an increased power level when a signal attenuation value between an access point and a client is above a threshold value, wherein the dynamic performance management system determines the frequency and/or the transmission power level by generating an adjacency matrix, showing the acceptable and unacceptable levels of interference between each set of two wireless local network elements, based upon the interference matrix, and by coloring a graph, using a predetermined maximum number of colors, based upon the generated adjacency matrix, and wherein the dynamic performance management system prunes most recently added nodes from the graph in a sequential order starting with a newest added node, when the predetermined maximum number of colors are insufficient to color the graph, and continues pruning until the predetermined maximum number of colors are sufficient to color the graph.

15. A method for controlling a plurality of wireless local area network elements of a plurality of wireless local area networks, comprising:

defining the plurality of wireless local area network elements and the plurality wireless local area networks;

generating interference data through an initiation phase that instructs each wireless local network element in each of the plurality of wireless local area networks to attempt to communicate with each other wireless local network element to generate interference data, wherein each combination of two wireless local area network elements is designated as a set of wireless local area networks;

receiving the interference data from the plurality of wireless local area network elements, the interference data indicating network elements that interfere with the other wireless local area network elements;

generating an interference matrix based upon the interference data that corresponds to a representation of network interference, and includes determined interference data for each set of wireless local area networks;

determining a frequency and/or transmission power level for each wireless local area network element to reduce interference with the interfering network elements, including determining the power level to be an increased power level when a signal attenuation value between an access point and a client is above a threshold value, in which determining the frequency and/or transmission power level is by generating an adjacency matrix based upon the interference matrix, wherein the adjacency matrix shows the acceptable and unacceptable levels of interference between each set of two wireless local network elements; and transmitting instructions to each wireless local area network element to control the frequency and/or transmission power level of the wireless local area network elements, wherein determining the frequency and/or the transmission power level includes generating an adjacency matrix, showing the acceptable and unacceptable levels of interference between each set of two wireless local network elements, based upon the interference matrix, and by coloring a graph, using a predetermined maximum number of colors, based upon the generated adjacency matrix, wherein determining the frequency and/or the transmission power level includes pruning most recently added nodes from the graph in a sequential order starting with a newest added node, when the predetermined maximum number of colors are insufficient to color the graph, and continues pruning until the predetermined maximum number of colors are sufficient to color the graph, and wherein the interference data includes determined interference data between every possible combination of two wireless local area network elements that are included in the plurality of wireless local area networks.

* * * * *